(12) United States Patent
Issac et al.

(10) Patent No.: US 10,574,153 B1
(45) Date of Patent: Feb. 25, 2020

(54) CONTROL CIRCUIT AND CONTROL METHOD FOR A THREE PHASE VIENNA CONVERTER

(71) Applicant: AMETEK ROTRON, Woodstock, NY (US)

(72) Inventors: Basil Issac, Whitefield (IN); Leslie W Yoho, Woodstock, NY (US); Matthew Clark, Woodstock, NY (US)

(73) Assignee: AMETEK ROTRON, Woodstock, NY (US)

( * ) Notice: Subject to any disclaimer, the term of this patent is extended or adjusted under 35 U.S.C. 154(b) by 0 days.

(21) Appl. No.: 16/262,740

(22) Filed: Jan. 30, 2019

(51) Int. Cl.
*H02M 7/217* (2006.01)
*H02M 7/219* (2006.01)
*H02M 1/12* (2006.01)
*H02M 1/42* (2007.01)

(52) U.S. Cl.
CPC ............. *H02M 7/217* (2013.01); *H02M 1/12* (2013.01); *H02M 1/4208* (2013.01)

(58) Field of Classification Search
CPC ........ H02M 7/217; H02M 7/219; H02M 1/12; H02M 1/4208; H02M 1/4258
See application file for complete search history.

(56) References Cited

U.S. PATENT DOCUMENTS

| 5,638,265 A * | 6/1997 | Gabor | ....................... G05F 1/70 363/81 |
| 5,969,962 A * | 10/1999 | Gabor | ................. H02M 1/4225 363/81 |
| 6,191,676 B1 * | 2/2001 | Gabor | ................. H02M 1/4225 336/160 |

* cited by examiner

*Primary Examiner* — Gary L Laxton
*Assistant Examiner* — Sisay G Tiku
(74) *Attorney, Agent, or Firm* — Maschoff Brennan

(57) ABSTRACT

Disclosed is a three phase Vienna converter for converting three phase AC to DC, with active power factor control. Further the control electronics is galvanically isolated from the neutral of the input three phase supply and also from the center terminal of the two series connected output DC filter capacitors. The control circuit is built completely with analog devices to meet stringent electromagnetic interference standards. The converter is capable of operating over a wide range of voltages and frequencies of the input supply voltage.

8 Claims, 6 Drawing Sheets

CONTROL CIRCUIT AND CONTROL METHOD FOR A THREE PHASE VIENNA CONVERTER

FIELD OF THE INVENTION

This disclosure belongs to the field of AC to DC power converters and, in particular, to three phase AC to DC power converters referred to as Vienna converters.

BACKGROUND OF THE INVENTION

Vienna converter configuration is one of the many configurations used for converting three phase AC power to DC power. Because of advantages such as active power factor correction, the Vienna converter has become a popular converter in the field of power electronics. Many control schemes are generally known in the field, offering various features and advantages.

All known converters of this type employ digital control electronics that execute dedicated software or control electronics that execute dedicated firmware for controlling the active switches of the power section of the converter. Almost all of them use a technique known as D-Q conversion. They also have the ground or zero volt rail of the control circuit connected to the center terminal of the series connected filter capacitors at the output of the converter.

Problems in the State of the Art

In certain applications, the incoming three phase supply voltages have a large range of frequencies. They also have amplitudes that vary considerably. Such applications also demand that the harmonic distortion introduced into the supply voltage by the AC to DC converter be limited to a low predefined value. Due to efficiency requirements the power factor of the converter also has a lower limit that is difficult to achieve.

SUMMARY OF THE INVENTION

Thus, the object of the disclosed Vienna converter along with its control circuits is to mitigate at least some of the problems in the prior art Vienna converters.

One object of the disclosed converter is to provide a Vienna converter with a very high power factor irrespective of the frequency and voltage of the input power supply.

Another object of the disclosed converter is to provide a Vienna converter that introduces a very low Total Harmonic Distortion into the three phase input supply voltage lines.

Another object of the disclosed converter is to provide a Vienna converter, the control circuit of which is galvanically isolated from the center terminal of the series connected output filter capacitors of the converter.

Yet another object of the disclosed converter is to provide a Vienna converter, the control circuit of which is galvanically isolated from the Neutral terminal of the three phase input supply.

One or more objectives of the invention are achieved by providing a control circuit for a three phase Vienna converter with a first controlled power switch and a second controlled power switch and a third controlled power switch. The control circuit includes an analog control circuit electrically isolated from a Neutral terminal of an input three phase supply and a center terminal of a series connected capacitor output filter of the Vienna converter. The analog control circuit further includes an error amplifier for generating a voltage error signal between a reference voltage and an output voltage feedback. The analog control circuit also includes a first isolation amplifier for generating a real-time representation of a first input supply voltage. The analog control circuit also includes a second isolation amplifier for generating a real-time representation of a second input supply voltage. The analog control circuit includes a first circuit for generating an RMS value of the first input supply voltage and a second circuit for generating an RMS value of the second input supply voltage. The analog control circuit further includes a first divider for dividing the real-time representation of the first input supply voltage by the RMS value of the first input supply voltage for generating a first Unity Sine Wave. In addition, the analog control circuit includes a second divider for dividing the real-time representation of the second input supply voltage by the RMS value of the second input supply voltage for generating a second Unity Sine Wave. In addition, the analog control circuit includes a first multiplier for multiplying the voltage error signal with the first Unity Sine Wave for generating a first current reference signal. Moreover, the analog control circuit includes a second multiplier for multiplying the voltage error signal with the second Unity Sine Wave for generating a second current reference signal. The analog control circuit includes first current error amplifier for generating a first control signal as the error between the first current reference signal and a first current feedback. The analog control circuit includes a second current error amplifier for generating a second control signal as the error between the second current reference signal and a second current feedback. The analog control circuit includes an inverting summing amplifier for summing the first control signal and the second control signal for generating a third control signal. The analog control circuit includes a first active rectifier, a second active rectifier and a third active rectifier, each configured for rectifying, each of the first control signal, the second control signal and the third control signal respectively. The analog control circuit includes a triangular carrier wave generator circuit for generating a triangular carrier wave signal. The analog control circuit includes a first comparator, a second comparator, a third comparator, each configured for comparing, the first control signal, the second control signal, and third control signal respectively, with the triangular carrier wave for generating gating pulses for controlling the first controlled power switch, the second controlled power switch, the third controlled power switch of the three phase Vienna converter.

Also disclosed is a method for generating gating pulses for a three phase Vienna converter according to one aspect of the disclosure. The method includes a step of generating attenuated phase to neutral voltages from phase to phase voltages with one or more phase shifting attenuating isolation amplifiers. The method further includes a step of generating RMS values of the attenuated phase to neutral voltages with one or more rectifiers cascaded with filters. The method further includes a step of dividing the attenuated phase to neutral voltage by the RMS values of associated with each of the attenuated phase to neutral voltage for generating Unity Sine Waves using one or more dividers. In addition, the method includes a step of generating a voltage error signal using an error amplifier. Further, the method also includes a step of multiplying the Unity Sine Waves with the voltage error signal for generating current reference signals using one or more multipliers. Furthermore, the method includes a step of generating control signals using current error amplifiers, from the current references and current feedbacks from the three lines. Lastly, the method includes a step of comparing the control signals with a triangular wave carrier signal using one or more comparators to generate gating signals for driving controlled power switches of the three phase Vienna converter.

The disclosed Vienna converter may have an advantage over prior art Vienna converters in that it does not require an electrical connection to the Neutral terminal of the input three phase power supply.

It may further offer the advantage that the control circuit is galvanically isolated from the center terminal of the series connected filter capacitors at the output of the converter.

It may also offer the advantage that it does not use any software or firmware as it is realized completely in the analog domain. This offers the further advantage that it need not adhere to guidelines such as Software Considerations in Airborne Systems and Equipment Certification, for example RTCA DO-178, and undergo related audits and qualification tests. It may also offer the further advantage that it need not adhere to guidelines such as Design Assurance Guidance for Airborne Electronic Hardware, for example RTCA DO-254., and undergo related audits and qualification tests.

The disclosed control circuit has the further feature of generating gating signals for the three controlled power switches that control the AC currents in the three lines based on a unipolar voltage error signal and a unipolar triangular wave carrier signals.

The summary above is illustrative only and is not intended to be in any way limiting. Further aspects, exemplary embodiments, and features will become apparent by reference to the drawings and the following detailed description.

BRIEF DESCRIPTION OF THE DRAWINGS

These and other features, aspects, and advantages of the exemplary embodiments can be better understood when the following detailed description is read with reference to the accompanying drawings in which like characters represent like parts throughout the drawings, wherein.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Figure 1:
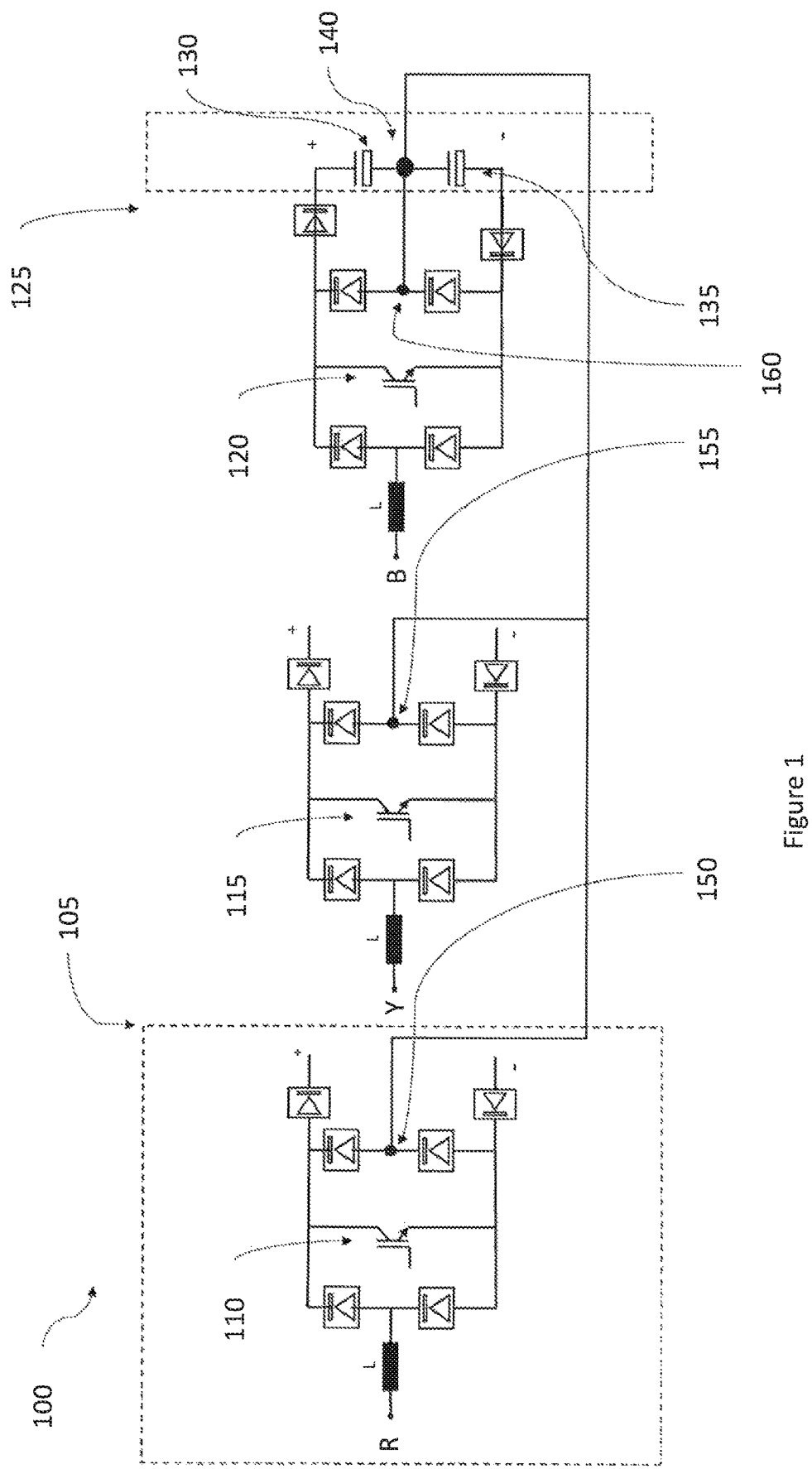
FIG. 1 shows the power circuit of the disclosed Vienna converter, implemented according to aspects of the present technique.
Figure 2:
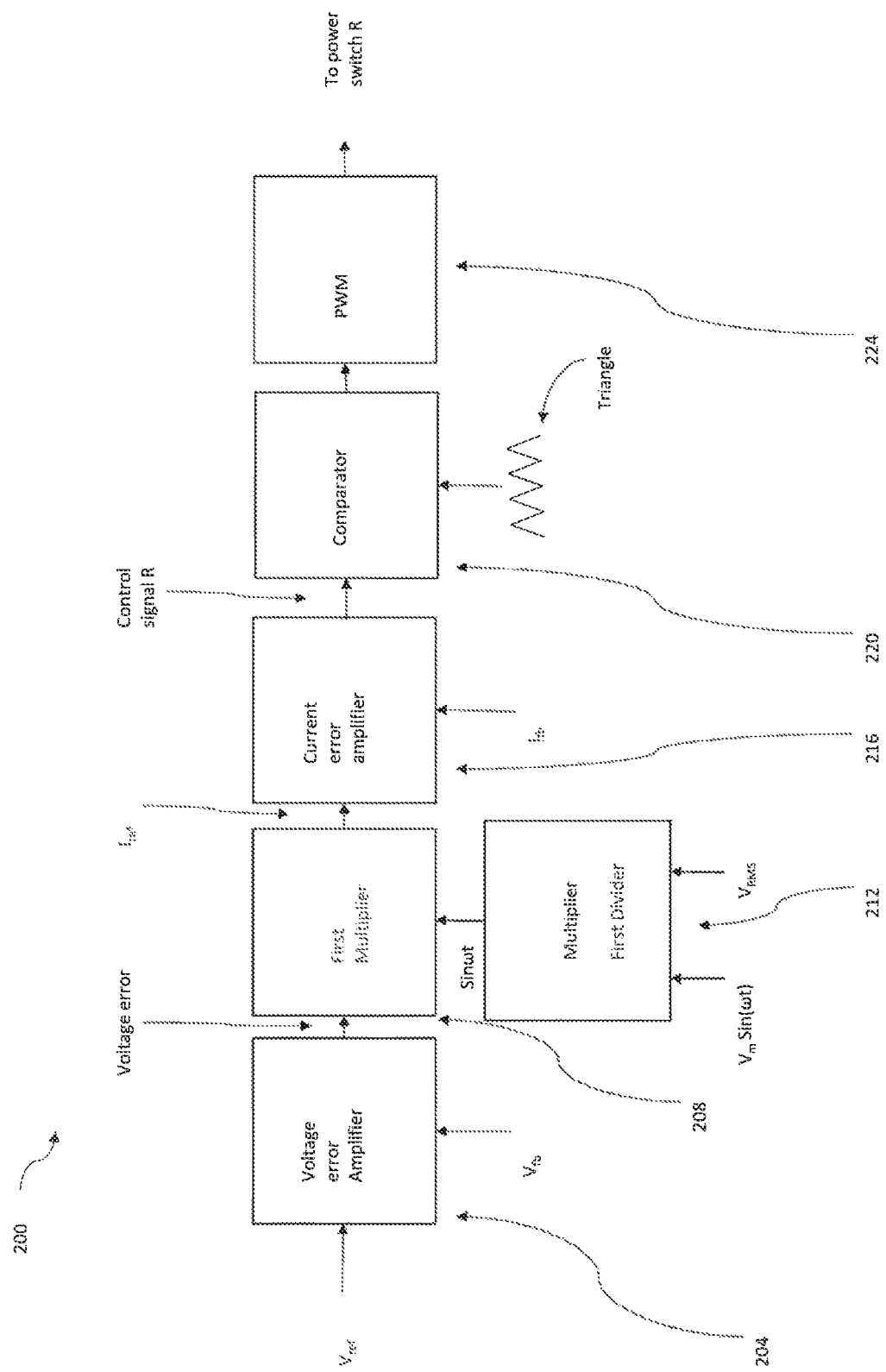
FIG. 2 is a block diagram of the control circuit for the R phase, implemented according to aspects of the present technique.
Figure 3:
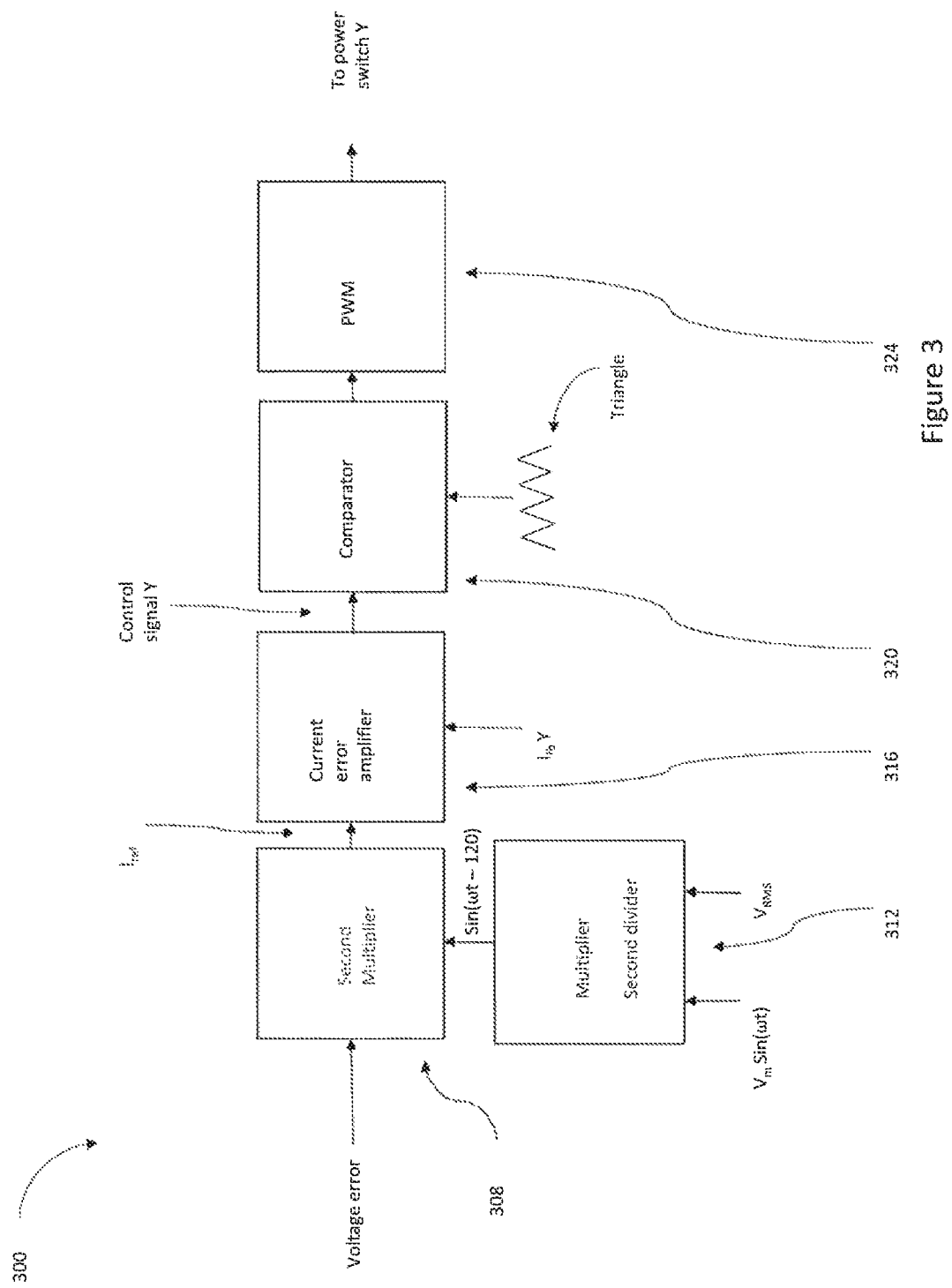
FIG. 3 is a block diagram of the control circuit for the Y phase, implemented according to aspects of the present technique.
Figure 4:
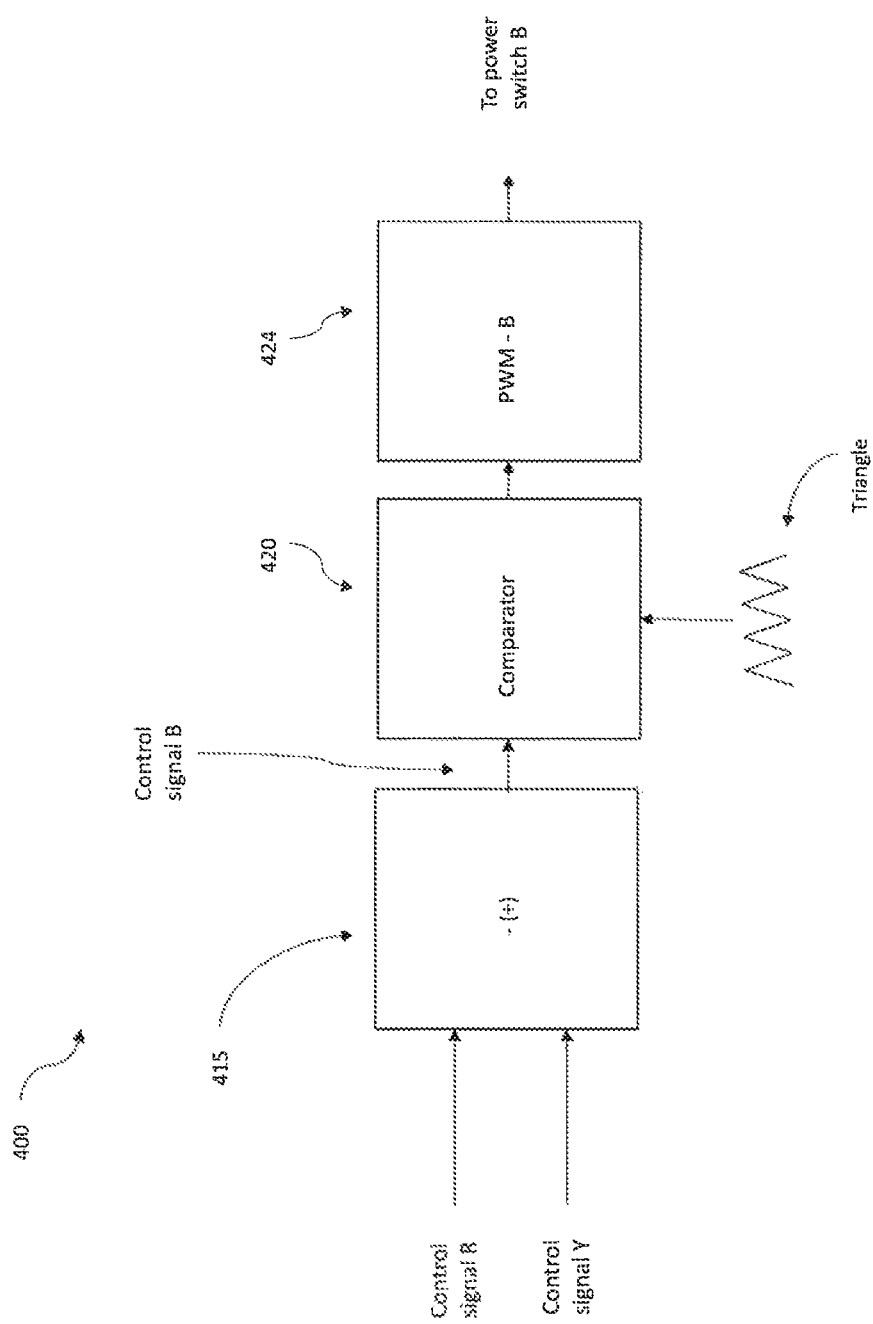
FIG. 4 is a block diagram of the control circuit for the B phase, implemented according to aspects of the present technique.

FIG. 1 shows the power circuit (100) of the disclosed Vienna converter. Describing the functioning of the circuit with reference to one of the phases (105) suffices for the understanding. The power circuit performance will be described with reference to the two blocks (105, 125) enclosed in dotted lines in FIG. 1. One inductor L, six diodes and one controlled power switch (110), form the power section of each phase. The controlled power switch (110) is switched on and off in a controlled way. The switching on instants, the duration of the on time are determined by the control circuit that will be described below. The switching on and off of the controlled power switch (110) generally follows the Pulse Width Modulation principle.

When the controlled power switch (110) is turned on, a current flows through the inductor (L) and energy is stored in the inductor (L). When the controlled power switch (110) is turned off, the energy is transferred to the output filter (125) with capacitors (130, 135) connected in series. As can be seen from the circuit under reference, the center terminal (140) of the series connected filter capacitors (130, 135) is connected to the center terminal (150,155, 160) of two series connected diodes of the power circuit (105).

Thus, all the controlled power switches (110, 115, 120) of the power circuit of the converter are switched on and off as determined by the control circuit.

In FIG. 1, the controlled power switches (110, 115, 120) are shown to be Insulated Gate Bipolar Transistors commonly known as IGBTs. Any suitable power switch, however, such as Metal Oxide Semiconductor Field Effect Transistors (MOSFETs) or a Bipolar Junction Transistors (BJTs) may be used. A person skilled in the art would be able to choose an appropriate device based on the requirements such as the PWM frequency, the power or current rating and so on.

Now the control circuits (200, 300, 400, 500, as shown in FIGS. 2-5) for generating the required PWM switching signal will be described in detail with reference to the Figures.

One of the features of the disclosed Vienna converter is the generation of Unity Sine Waves representing two phase voltages of the input supply voltages. A Unity Sine Wave, as used herein, is a Sine wave which bears a certain predetermined phase relationship with a phase voltage of the input supply voltage but has a constant amplitude irrespective of the frequency and amplitude of the supply voltage. Considering one of the phase voltages, the phase voltage is represented as, $$V_m \operatorname{Sin} \omega t$$

Wherein, ω is equal to 2πf. Further, it is known that, the average value of a sine wave is $$V_{DC} = \frac{V_m}{\pi} \int_0^\pi \operatorname{Sin}\omega t \, d\omega t$$
$$= \frac{V_m}{\pi} [-\cos\omega t]_0^\pi$$
$$= \frac{V_m}{\pi} [-\cos\pi + \cos 0]$$
$$= \frac{V_m}{\pi} [1 + 1] = \frac{2V_m}{\pi}$$

It is known that for a sine wave the RMS value is $$\frac{2V_m}{\pi} \times 1.110 = 0.707 V_m$$

Thus, dividing the AC waveform by its RMS value results in a sine wave of constant amplitude, irrespective of its amplitude and frequency.

Figure 5:
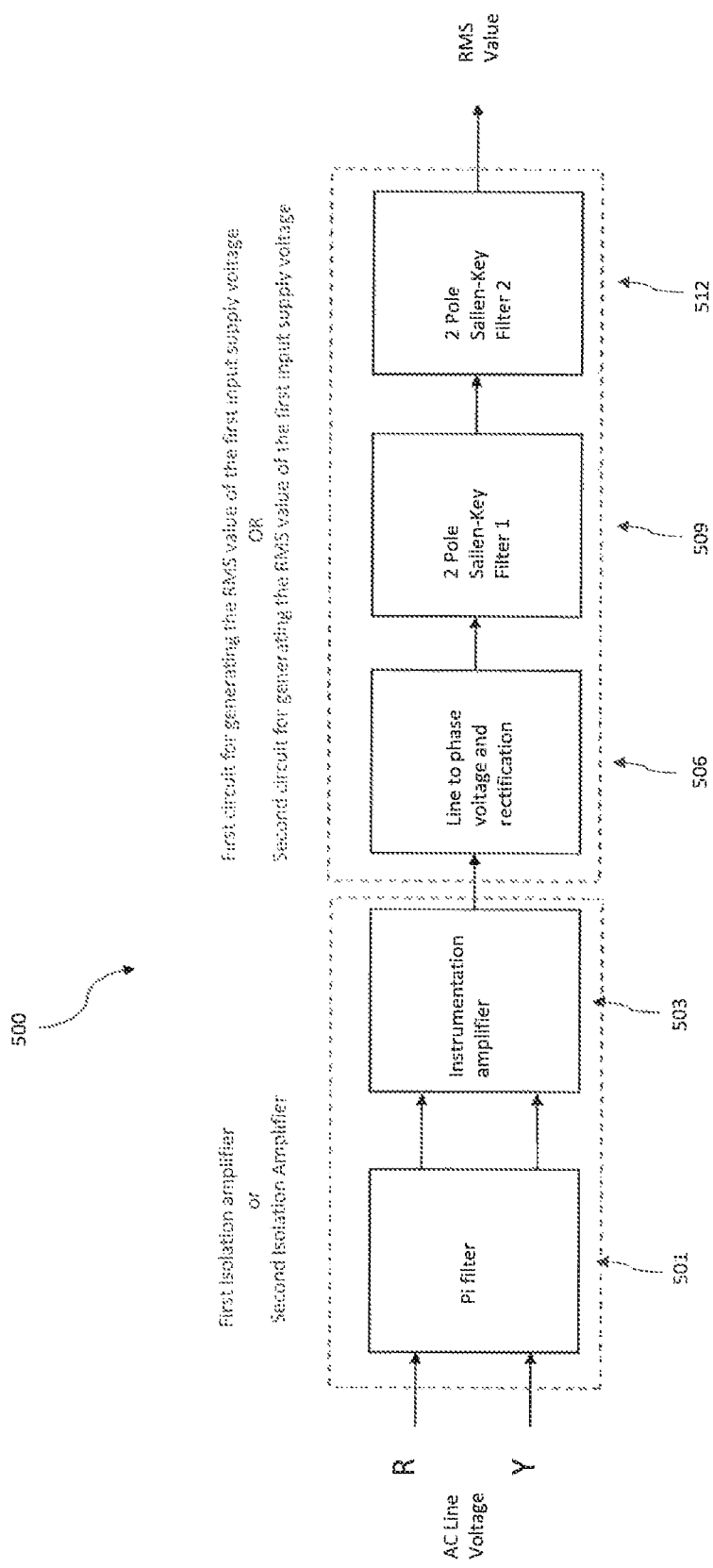
FIG. 5 is a block diagram of the circuit to generate the RMS value of an input supply voltage, implemented according to aspects of the present technique.

This is achieved as follows, with reference to FIG. 5. The Phase voltage is filtered using a pi filter (501) and attenuated with an instrumentation amplifier (503) by an attenuation factor of hundred, for instance. The phase angle of this voltage is changed by −30° using an integrator and then active rectified (506) and fed to a two stage cascaded 2-pole Sallen-Key filters (509, 512). The output of the Sallen-Key filter is the RMS value of the input AC voltage. The attenuated AC voltage is divided (212, 312) by the RMS value obtained to get a unity sine wave.

However, in another important feature of the disclosed Vienna converter, a three phase three wire system without a neutral connection is used. To achieve this, the phase to phase voltages are converted to their corresponding phase to neutral voltage equivalents by using phase shifting amplifiers which add a phase shift of −30° electrical (506). The output of the phase shifter is the representation of the phase voltage. For instance if the $V_m \operatorname{Sin}(\omega t)$ is the $V_{RY}$ phase to phase voltage and $V_m \operatorname{Sin}(\omega t - 30)$ is the phase to neutral voltage.

Thus, two such blocks of the control circuit (500) provide the RMS values of the two sine waves corresponding to the R phase and the Y phase.

Hereafter the control circuit for achieving a constant and stiff DC bus voltage at the output of the converter is described.

A DC voltage reference ($V_{ref}$), 10 V for instance, and the output DC voltage ($V_{fb}$), suitably attenuated with an instrumentation amplifier, are fed to an error amplifier (204). Typically, the error amplifier is configured as a proportional integral (PI) controller or a proportional integral differential (PID). The DC output voltage fed back to the error amplifier (204) is referred to as the voltage feedback ($V_{fb}$). The modulus of the output of the error amplifier is obtained by active rectification and its amplitude is suitably clipped to limit extreme excursions of the error voltage (not shown). The blocks for the last two functions are not shown in FIG. 2 since such signal processing is well known in the art.

The error voltage is multiplied in Multipliers (208, 308), individually, with the unity sine wave Sin(ωt−30) and Sin (ωt−150) derived from the RY and YB voltages after phase shifting them to obtain the representation of the phase voltages equivalent to the R phase and the Y phase. The output from the multipliers (208, 308) are the current references ($I_{ref}$ R, $I_{ref}$ Y) for controlling the instantaneous currents in the R phase and the Y phase. These current references are individually fed to two error amplifiers (216, 316) that are similar to the voltage error amplifier (204) used to produce the error voltage. Typically, the error amplifier is configured as a PI controller or a PID controller. The proportional (P), integral (I) component and the differential (D) component (if any), however, of the current error amplifiers may be different from the P, I and D components of the voltage error amplifier. Selection of these is well understood by a person skilled in the art. The feedback to these current error amplifiers ($I_{fb}$ R, $I_{fb}$ Y), however, are the line currents of the R and Y phases, respectively. The outputs of the two current error amplifiers (216, 316) are referred to as the control signals (Control signal R, Control signal Y). The two current signals summed together (415) and inverted results in the control signal for the B phase (Control signal B).

The three control signals are processed suitably (not shown) and compared in comparators (220, 320, 420) with a unipolar triangular waveform (Triangle) to obtain the PWM signals to control the switching of the three controlled power switches of the three phases.

The three PWM pulses are fed to the control terminals of the three controlled power switches (110, 115, 120), with suitable isolation and level shifting and further suitable processing (224, 324, 424). The further processing may include filtering, current amplification and such as required to switch the controlled power switches (110, 115, 120) as specified by the device manufacturer for reliable switching and reduces power dissipation in the devices. The switching on and off of the controlled power switches (110, 115, 120) results in the three phase currents leading to the required DC output voltage across the series connected filter capacitors (130, 140).

The disclosed control circuit of the Vienna converter, thus, has the following essential features. Attenuated representations of the phase to neutral voltages are generated with suitable attenuators. The RMS values of these signals are derived using a suitable method. The Sallen-Key filter based circuit may be one among many other such methods. The attenuated representations of the phase to neutral voltages are divided by their RMS values to obtain Unity Sine Wave signals. The Unity Sine Wave signals are multiplied with the voltage error signal to obtain current reference signals. The current error signals, also referred to as the control voltage signals, generated by current error amplifiers with current reference signals and current feedback signals are compared with a triangular wave carrier signal for generating the gating signals for the controlled power switches of the Vienna converter.

Figure 6:
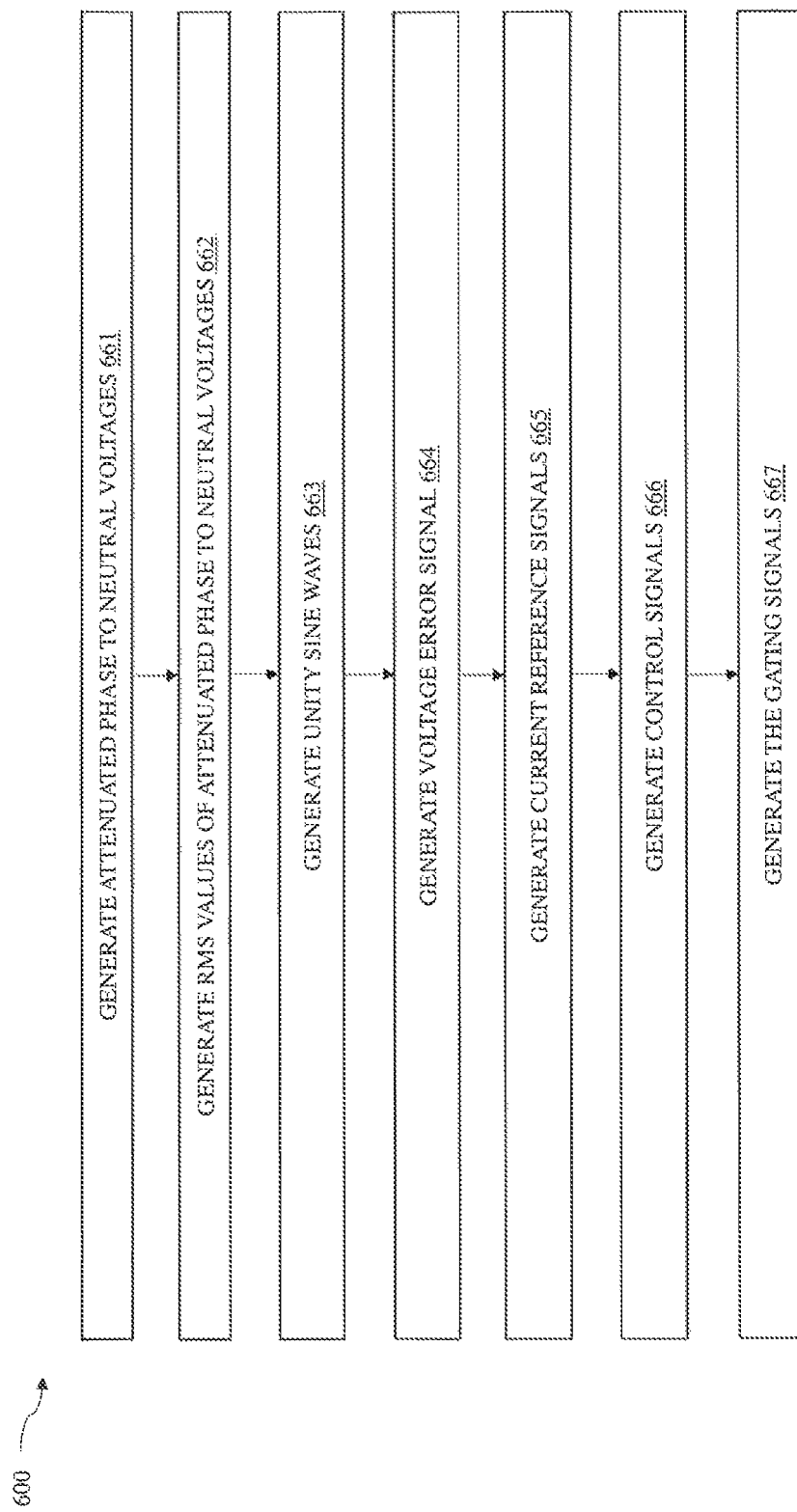
FIG. 6 is a flow chart depicting the method to generate gating signals for the three controlled power switches of the disclosed Vienna converter, implemented according to aspects of the present technique.

FIG. 6 is a flow chart 600 depicting the method to generate gating signals for the three controlled power switches of the disclosed Vienna converter, implemented according to aspects of the present technique.

The disclosed control circuit for the Vienna converter is one implementation of the following general method (600). The method comprises a step (661) of generating attenuated phase to neutral voltages from phase to phase voltages with one or more phase shifting attenuating isolation amplifiers. It comprises a step (662) of generating RMS values of the attenuated phase to neutral voltages with one or more rectifiers cascaded with filters. It comprises a step (663) of dividing the attenuated phase to neutral voltages by the RMS values of associated with each of the attenuated phase to neutral voltages to generate Unity Sine Waves using one or more dividers. It comprises a step (664) of generating a voltage error signal using an error amplifier. It comprises a step (665) of multiplying the Unity Sine Waves with a voltage error signal to obtain current reference signals using one or more multipliers. It comprises a step (666) of generating control signal using current error amplifiers from the current references and current feedbacks from the three lines. It comprises a step (667) of comparing the control signals with a triangular wave carrier signal using one or more comparators to generate the gating signals for driving the controlled power switches.

Further, it is to be noted that while the disclosed implementation of the Vienna converter has been described in detail, many other variants of may occur to a person skilled in the art. Still further, circuits have been described in terms of their function's functional blocks and not with circuits and their discrete components only because there are several ways to realize each of the blocks. For instance, an error amplifier with unipolar power supply has been described. The error amplifier itself may be built using discrete components or using suitable operational amplifiers, referred to as OpAmps, manufactured by several manufacturers. It is also possible to build the error amplifier using a bipolar power supply and analog process the error signal to obtain a unipolar error signal. This too may be achieved either clipping the signal at a preferred voltage or by active rectification of the signal. It is to be noted that all such variations are to be treated as falling within the scope of this disclosure and the appended claims. Similarly, the unipolar triangle wave carrier may be generated as a bipolar signal and then level shifted and so on.

The method of controlling the disclosed Vienna converter is described in terms of generic steps and generic blocks or functions, for example an error amplifier or one or more multipliers and so on. If the method is executed through the use of dedicated hardware running firmware, it is to be understood that that too falls under the scope of this disclosure.

The method of controlling the disclosed Vienna converter is described in terms of generic steps. Further, it is not implied that the steps are chronological in nature, that is, a step described after another does not necessarily mean that the latter follows the former, and a person skilled in the art will readily understand this. It may be visualized as all the steps being carried out simultaneously, in real time and this is also self-evident for a person skilled in the art.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A control circuit for a three phase Vienna converter with a first controlled power switch and a second controlled power switch and a third controlled power switch, the control circuit comprising:

an analog control circuit electrically isolated from a Neutral terminal of an input three phase supply and a center terminal of a series connected capacitor output filter of the Vienna converter, the analog control circuit comprising:

an error amplifier for generating a voltage error signal between a reference voltage and an output voltage feedback;

a first isolation amplifier for generating a real-time representation of a first input supply voltage;

a second isolation amplifier for generating a real-time representation of a second input supply voltage;

a first circuit for generating an RMS value of the first input supply voltage;

a second circuit for generating an RMS value of the second input supply voltage;

a first divider for dividing the real-time representation of the first input supply voltage by the RMS value of the first input supply voltage for generating a first Unity Sine Wave;

a second divider for dividing the real-time representation of the second input supply voltage by the RMS value of the second input supply voltage for generating a second Unity Sine Wave;

a first multiplier for multiplying the voltage error signal with the first Unity Sine Wave for generating a first current reference signal;

a second multiplier for multiplying the voltage error signal with the second Unity Sine Wave for generating a second current reference signal;

a first current error amplifier for generating a first control signal as an error between the first current reference signal and a first current feedback;

a second current error amplifier for generating a second control signal as the error between the second current reference signal and a second current feedback;

an inverting summing amplifier for summing the first control signal and the second control signal for generating a third control signal;

a first active rectifier, a second active rectifier and a third active rectifier, each configured for rectifying, each of the first control signal, the second control signal and the third control signal respectively;

a triangular carrier wave generator circuit for generating a triangular carrier wave signal; and a first comparator, a second comparator, a third comparator, each configured for comparing, the first control signal, the second control signal, and the third control signal respectively, with the triangular carrier wave for generating gating pulses for controlling the first controlled power switch, the second controlled power switch, the third controlled power switch of the three phase Vienna converter.

2. The control circuit of claim 1, wherein the error amplifier is configured as an error amplifier with a unipolar power supply, for obtaining a unipolar error voltage signal.

3. The control circuit of claim 1, wherein each of the circuit for generating the RMS value comprises an active rectifier for rectifying the real-time representation of the input supply voltage for generating a DC value, and two cascaded second order linear time invariant filters for filtering the DC value for generating the RMS value.

4. The control circuit of claim 3, wherein the two cascaded second order linear time invariant filters are Sallen-Key filters.

5. The control circuit of claim 1, wherein the triangular carrier wave generator circuit for generating the triangular carrier wave signal is configured for generating a unipolar triangular carrier wave signal.

6. The control circuit of claim 1, wherein the triangular carrier wave generator circuit comprises a bipolar triangular wave generator for generating a bipolar triangular carrier wave signal and a level shifter for converting the bipolar triangular carrier wave signal to a unipolar triangular carrier wave signal.

7. A method for generating gating pulses for controlling a three phase Vienna converter, the method comprising: a step of generating attenuated phase to neutral voltages from phase to phase voltages with one or more phase shifting attenuating isolation amplifiers; a step of generating RMS values of the attenuated phase to neutral voltages with one or more rectifiers cascaded with filters; a step of dividing the attenuated phase to neutral voltages by the RMS values of each of the attenuated phase to neutral voltages for generating Unity Sine Waves using one or more dividers; a step of generating a voltage error signal using an error amplifier; a step of multiplying the Unity Sine Waves with the voltage error signal for generating current reference signals using one or more multipliers; a step of generating three control signals using current error amplifiers, from the current references and current feedbacks; and a step of comparing the control signals with a triangular wave carrier signal using one or more comparators for generating gating signals for driving controlled power switches of the three phase Vienna converter.

8. The method of claim 7, wherein one of the three control signals is derived from summing and inverting two other control signals.

* * * * *